United States Patent Office 3,243,390
Patented Mar. 29, 1966

3,243,390
WATER-BASE PAINT CONTAINING HYDROGENATED HYDROCARBON RESIN AND BUTYL RUBBER
George O. Hillard, Jr., Westfield, N.J., and Neville Leverne Cull, Baker, La., assignors to Esso Research and Engineering Company, a corporation of Delaware
No Drawing. Filed July 20, 1962, Ser. No. 211,398
5 Claims. (Cl. 260—8)

The present invention deals with an improved composition for water-based emulsion paints. More particularly, it relates to a paint composition having good properties, especially with regard to color stability, by the use of a combination of a hydrogenated hydrocarbon resin and an elastomer latex, particularly that of butyl rubber.

In recent years water-based paints, commonly known as emulsion paints, have proven to be increasingly popular. Conventionally, they are made by the use of dispersions of materials such as vinyl chloride, vinylidene chloride, resinous styrene-butadiene copolymers, vinyl acetate polymers, etc., together with conventional fillers such as titanium dioxide and the like. Such emulsion paints offer advantages over solvent-based paints with respect to ease of application, as well as mild odor.

While emulsion paints are widely used, there remain many improvement areas. When employing relatively brittle high unsaturation binder materials such as styrene-butadiene resins, excessive brittleness tends to occur during aging as the high styrene resins continue to harden. Conventional emulsion paints which resist embrittlement generally employ relatively high cost materials. In addition, many of the resinous binders employed are not film-forming at low temperatures, especially when highly loaded, and the paint films may flake or crack when applied at low temperatures. Volatile film-coalescing aids or plasticizers must often be added to these resinous binders. Failure of emulsion paints to "wet" oily surfaces, or for the resinous binder particles to completely coalesce, also sometimes results in poor adhesion of these paints to various substrates.

It has been suggested previously that one means of reducing the cost of emulsion paints is to add relatively low cost resins, such as petroleum resins, to the emulsion composition. These resins are added merely to make the paint cheaper and result in a downgrading of the final product. They form films which are brittle initially and which tend to become more brittle and crack during aging.

Means have now been found for obtaining an emulsion-type paint which is relatively low cost and exhibits good properties as to hardness, erosion, enamel holdout, and particularly with respect to color stability on aging. In accordance with the present invention, by employing as the paint binder a combination of a major portion of a hydrogenated hydrocarbon resin and a minor portion of an elastomer in a latex form, a paint composition is obtained which is free of the disadvantages heretofore characteristic when either hard hydrocarbon resins or rubbers were employed as binding agents. The good features of an elastomer latex and hard hydrogenated hydrocarbon resin emulsions are combined and the poor features of both eliminated when the two are blended in a ratio of resin to rubbery particles of from about 30/70 to 90/10, preferably 60/40 to 85/15, on a solids to solids weight basis.

The elastomer constituent is preferably a butyl rubber copolymer of 85 to 99.5 wt. percent of a $C_4$ to $C_7$ isoolefin, e.g., isobutylene, 2-methyl 1-butene, etc., and 0.5 to 15 wt. percent of a $C_4$ to $C_{14}$ multiolefin, e.g., myrcene, isoprene, butadiene, etc. The butyl rubber copolymer has a Staudinger molecular weight between about 20,000 to 300,000, and an unsaturation level (characteristically substantially lower than other rubbery polymers) represented by an iodine number between about 0.5 to 20. Butyl rubber is well known in the art. For example, see, "Synthetic Rubber," by G. S. Whitby (1954) and U.S. Patent No. 2,356,128 to Thomas et al. describing its preparation. As used in the specification and claims, the term "butyl rubber" denotes the above type of rubbery copolymer. By employing a butyl rubber latex characterized by its low degree of unsaturation in conjunction with a hydrogenated petroleum resin, not only does the paint composition not harden upon aging (as is conventional in emulsion paints) but, surprisingly, color retention is excellent also.

It is well known to produce latices of butyl rubber by any number of methods. For example, a solution of butyl rubber in a hydrocarbon or other solvent, particularly a $C_4$ to $C_{10}$ aliphatic, may be emulsified with water, particularly in the presence of a salt of a $C_8$ to $C_{18}$ organic sulfate ester and a monovalent salt of dihydrogen orthophosphate. The organic solvent may then be stripped, leaving a rubber-water dispersion. Alternatively, the latices may be prepared by working dispersion agents into the already dried polymer and gradually adding water. A more detailed description of the preparation of the butyl rubber latices may be had by referring to co-assigned U.S. Patent No. 2,595,797, among others. In general, the following emulsifiers are preferred for the butyl rubber latices: sodium or ammonium salt of nonylphenoxy (polyethyleneoxy) sulfate, sodium salt of sulfate ester of polyethylene oxide adduct of tridecyl alcohol, polyethylene oxide adduct of dodecyl phenol. Other emulsifiers include the fatty alcohol sulfates having the formula $MRSO_4$ where M is sodium, potassium, ammonium, triethanolamine and diethanolamine and R is lauryl, oleyl, cetyl or their ethoxylated derivatives. A particularly suitable emulsifier in this class is sodium lauryl sulfate.

Although less desirable, other elastomers may be employed in the compositions of the present invention. Examples thereof are natural rubber, butadiene-styrene rubbery copolymers, polyisoprene, cis-butadiene, chloroprene, silicone rubbers, and rubbery acrylates.

The hydrogenated hydrocarbon resins employed in the compositions of the present invention are normally derived from the polymerization of hydrocarbon residues boiling above 600° F. These residues may be obtained from the catalytic cracking, distillation, or thermal cracking of petroleum oils. Alternatively, they may be obtained from pitches, asphaltenes or coal tar residues. They may also be obtained as cracked products from steam-cracking residues or fluid coking.

These hydrocarbon resins are characterized by their low molecular weight, e.g., 500 to 5,000 Staudinger molecular weight, as well as their brittleness and low softening points, e.g., less than 150° C. Normally they are made by polymerizing a mixture of high boiling aromatics and unsaturates by use of catalyst systems such as Friedel-Crafts catalysts, $AlCl_3$, $FeCl_3$, or $BF_3$ etherate.

Particularly preferred is the hard hydrocarbon resin produced by the polymerization of unsaturates derived from the deep cracking of petroleum and which has a molecular weight of approximately 900 to 1300 and a ball and ring softening point of approximately 95 to 105° C.

The hydrocarbon resin is hydrogenated in a hydrocarbon solvent which may be the same as that used in the polymerization process or it may be some other hydrocarbon such as hexane or its isomers, heptane or its isomers, octane or its isomers, benzene or mixtures thereof and the like. The hydrogenation is effected under pressures of 0 to 5000 p.s.i.g. and at temperatures of 38 to 230° C. for from a few minutes up to 30 hours or more in the presence of a suitable catalyst, such as nickel, reduced nickel, nickel sulfide, copper chromide, cobalt molybdate, molybdenum sulfide, supported or not on light porous or granular particles of large surface area such as $MoS_2$ on charcoal. The hydrogenation may be carried out batchwise or continuously. The amount of catalyst in a batch operation should generally be about 5 to 50% by weight based on the amount of resin being subjected to hydrogenation. If continuous hydrogenation is used, the feed rate of the resin solution should be about 0.1 to 5, preferably about 0.3 to 1.0, v./v./hr. A suitable process is that described in U.S. Patent No. 2,963,467 to A. B. Small which is incorporated herein by reference.

The hydrogenated resin can be emulsified in the manner described with reference to butyl rubber. Thus the butyl rubber and the resin can be dissolved in the same solvent and the mixture emulsified or the solutions may be separately prepared and separately emulsified and the resulting latices blended. One suitable method is to prepare the butyl latex by the usual solution method as described above and to separately prepare the hydrogenated resin latex by the inversion technique in which the emulsifying agents may be worked into the resin on a mill while gradually adding water. A water-in-oil emulsion is first formed which inverts to an oil-in-water emulsion as more water is added. The resulting latex can then be blended with a standard butyl rubber latex. Paints are prepared from these blended latices by the addition of pigments and fillers as described below.

In a preferred embodiment, up to about 30 wt. percent, preferably 5 to 20 wt. percent, based upon total binder (hydrocarbon resin plus elastomer) of casein is employed in the paint composition as a means of obtaining improved enamel holdout and erosion properties.

It should be noted that other polymeric paint binders, such as high styrene-butadiene resins, do not give the advantages afforded by butyl rubber latex in plasticizing the hard hydrogenated hydrocarbon resins and preventing embrittlement. Conventional plasticizers are not permanent and adversely affect freeze-thaw stability whereas butyl rubber latex acts as a permanent effective plasticizer for the hydrogenated hydrocarbon resin, while simultaneously acting as a binder itself to supplement binding action of the resin. Further, it does not diminish freeze-thaw stability.

In addition to the binder of hydrogenated hydrocarbon resin and elastomer latex, the composition of the present invention will contain conventional fillers, such as calcium carbonate, titanium dioxide, calcium silicates, silicas, clays and talcs. It is preferred to use a pigment volume concentration of less than about 50 volume percent based on total paint solids (equivalent to 50 to 70 wt. percent based on total solids) with calcium carbonate being particularly desirable.

In addition to the pigment fillers and binding components, the emulsion paint compositions of the present invention will contain various conventional paint ingredients, such as dispersing agents for the pigment, e.g., potassium tripolyphosphate and a polycarboxylate, freeze-thaw stabilizers, such as ethylene glycol, fungicides, such as phenyl mercuric acetate, driers, such as cobalt and lead naphthenate, as well as thickeners, such as methyl cellulose and sodium polyacrylate. The latter materials are used in a wide range of conventional concentrations.

Typically, the paint compositions of the present invention are prepared by first dispersing the pigment in water by means of dispersing agents, grinding and/or thoroughly mixing the admixture, and thereafter blending with the binder composition. Alternatively, they can be prepared by grinding the pigment with a protective colloid such as casein and blending this grind with the binder. In certain instances it is even possible to add the pigments dry to the binder composition and then grind them in.

The following table presents a comparison of proportions of materials found in the emulsion paint compositions of this invention.

TABLE I

| Binder | Wt. percent | |
|---|---|---|
| | Broad range | Preferred |
| Hydrogenated hydrocarbon resin emulsion: | | |
| Resin | 20 to 80 | 40 to 60. |
| Water | 80 to 20 | 60 to 40. |
| Emulsifier | 0.3 to 10 | 1 to 4. |
| Rubber latex: | | |
| Rubber | 25 to 75 | 45 to 65. |
| Water | 75 to 25 | 55 to 35. |
| Emulsifier | 0.1 to 10 | 0.5 to 5. |
| Volume ratio of binder to pigment [1] | 3 to .35 | 1.5 to .65. |
| Weight ratio of hydrocarbon resin to elastomer latex [1] | .50 to 9 | 1.5 to 6. |

[1] On a solids to solids basis.

The various aspects and modifications of the present invention will be made more clearly apparent by reference to the following description and accompanying examples.

Typical hydrogenated hydrocarbon resin emulsions used in the following examples were prepared by hydrogenating, as described above, a hydrocarbon resin obtained by polymerizing the unsaturates derived from the deep cracking of petroleum. The unhydrogenated resin, known as PRLA resin, is a thermoplastic solid having a softening point of $100° \pm 36°$ C. (ring and ball method), a specific gravity at $25/25°$ C. of 0.97 to 0.975, a molecular weight of 1100, a flash point of 500° F. (C.O.C.).

A resin similar to that described above having a softening point of 86.1° C. and an iodine number of 175 was dissolved in hexane as the solvent to give a 23 wt. percent solution. The resulting cement was hydrogenated over a 20 wt. percent Harshaw nickel catalyst at a temperature of 375–400° F. for 4 to 8 hours at a pressure of 3000 p.s.i.g. The product was filtered and a portion was stripped to give a product with a softening point of 90.3° C. and an iodine number of 73. (Approximately 60% hydrogenated.) Eighteen hundred grams of a 50/50 wt. percent solution of this product in a 75/25 mixture of hexane and benzene were mixed with 3300 grams of an 18.3 wt. percent NVM solution of butyl rubber in hexane. This mixture was added to 3000 grams of water containing 5 phr. of sodium lauryl sulfate and 1 phr. $NaH_2PO_4$ as stabilizer. The mixture was emulsified for 1 hour in a laboratory dispersator following which the hexane was stripped out at atmospheric pressure. The latex was further concentrated to 50.8% NVM by stripping off water under vacuum. The resulting latex (A) had the following inspections:

| | |
|---|---|
| Viscosity, cps. | 800 |
| pH | 6.1 |
| Filterability, cc. | 2.8 |
| Sludge | Trace |
| Solvent, content, wt. percent | .07 |
| Particle size, microns | .56 |

Another latex was prepared from the same hydrocarbon-butyl rubber-hexane mixture in the same manner as above except that the emulsifier used was 5 phr. of sodium oxyethylene nonylphenol sulfate. A finished latex (B) having a particle size of .49 was obtained on stripping to 51.1% solids.

A third latex (C) was prepared by separately preparing the butyl rubber latex and an unhydrogenated resin latex and blending the two. The resin latex was prepared by the inversion technique described above. A fourth latex (D) was prepared in the same manner as latex A except that the resin was unhydrogenated and used as a control.

Example I

An emulsion paint was prepared from each of the above latices as binder, the butyl rubber and hydrogenated or unhydrogenated resin being present in the binder in the proportion of 40 wt. percent butyl rubber and 60 wt. percent hydrogenated resin. The paint was prepared by first dispersing the pigment in water, grinding it, and then blending the resulting composition with the binder. Other than the composition of the binder, the same formulation was employed in each case. The following formulation was used:

| | Parts by weight |
|---|---|
| Rutile titanium dioxide (Ti-Pure R–510) | 104.2. |
| Potassium tripolyphosphate | 0.2. |
| ZnO | 63.7. |
| $CaSiO_3$ | 33.3. |
| $Al_2O_3$–$SiO_2$ $(H_2O)_x$ | 104. |
| Phenylmercuric acetate | 0.3. |
| $NH_4OH$ (28%), to pH | 8. |
| Water, to give | 30.4. |
| 3% methyl cellulose solution (Methocel HG 4000 cps.) | enough to give desired viscosity. |
| 6% cobalt drier (Cobalt Cyclodrex) | 3.5. |
| Daxad (naphthalene sulfonic acid) | 2.9. |
| Binder, to give | 50% PVC. |

Each of the binder systems were tested in this formulation for color stability. The following data were obtained:

| Latex | A | B | C | D |
|---|---|---|---|---|
| Reflectance, percent | 85 | 84 | 83 | |
| Opacity, percent | 96.5 | 97.6 | 96.4 | |
| Color: | | | | |
| Original | Off White | | Yellow | Yellow. |
| 1 wk. at 150° F | do | do | Brown | Dark Yellow. |
| 1 wk. Fadeometer | do | | Tan | Brown. |

The above data clearly show that the latices containing hydrogenated resin (latex A) are far superior to those containing unhydrogenated resin (latices C and D) from the standpoint of color stability.

The nature of the present invention having been thus fully set forth and specific examples of the same given, what is claimed is new and useful and desired to be secured by Letters Patent is:

1. An improved emulsion paint composition containing as a binder 30 to 90 wt. percent of a hydrocarbon resin having a molecular weight of 900 to 1300 and a ball and ring softening point of 95 to 105° C. prepared by Friedel-Crafts polymerization of the unsaturates obtained by the cracking of petroleum fractions which resin has been hydrogenated under pressures of 0 to 5000 p.s.i.g. at temperatures of 38 to 230° C. for a time from a few minutes up to 30 hours in the presence of a catalyst and 70 to 10 wt. percent (based on solids) of a latex of a rubbery butyl rubber copolymer of 85 to 99.5 wt. percent of a $C_4$ to $C_7$ isoolefin and 0.5 to 15 wt. percent of a $C_4$ to $C_{14}$ multiolefin.

2. The composition of claim 1 which contains casein.

3. The emulsion paint of claim 1 which contains about 3 to 0.3 parts by volume of said binder per part by volume of pigment.

4. The composition of claim 1 wherein said hydrocarbon resin and butyl rubber latex are employed in a weight ratio of about 75/25.

5. The process of preparing an emulsion paint composition which comprises admixing an aqueous pigment dispersion with a binder system containing 60 to 85 wt. percent of a hydrocarbon resin having a molecular weight of 900 to 1300 and a ball and ring softening point of 95 to 105° C. prepared by Friedel-Crafts polymerization of the unsaturates obtained by the cracking of petroleum fractions which resin has been hydrogenated under pressures of 0 to 5000 p.s.i.g. at temperatures of 38 to 230° C. for a time from a few minutes up to 30 hours in the presence of a catalyst and 40 to 15 wt. percent of a latex of a rubber copolymer of 85 to 99.5 wt. percent of a $C_4$ to $C_7$ isoolefin and 0.5 to 15 wt. percent of a $C_4$ to $C_{14}$ multiolefin.

References Cited by the Examiner

UNITED STATES PATENTS 2,824,860  2/1958  Alridge et al. _____ 260—82

OTHER REFERENCES

Fisher: "Paint and Varnish Technology," 1948, Reinhold Publ. Corp., New York, pp. 50, 182, 183, 390.

Piccopale Folder, published by Pennsylvania Industrial Chem. Corp., received Aug. 27, 1959.

WILLIAM H. SHORT, *Primary Examiner.*

LEON J. BERCOVITZ, *Examiner.*

J. ZIEGLER, E. M. WOODBERRY, *Assistant Examiners.*